US008321864B2

(12) United States Patent
Bone et al.

(10) Patent No.: US 8,321,864 B2
(45) Date of Patent: Nov. 27, 2012

(54) DEVICE MANAGEMENT

(75) Inventors: Nicholas Bone, Thatcham (GB); Caroline Jessica Belrose, Marlborough (GB); Timothy Wright, Reading (GB); Stephen Babbage, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 1096 days.

(21) Appl. No.: 11/876,709

(22) Filed: Oct. 22, 2007

(65) Prior Publication Data
US 2008/0271023 A1    Oct. 30, 2008

(30) Foreign Application Priority Data

Oct. 20, 2006 (GB) .................................. 0620927.4

(51) Int. Cl.
*G06F 9/46* (2006.01)
(52) U.S. Cl. ............................. 718/100; 719/316; 718/1
(58) Field of Classification Search .................. None
See application file for complete search history.

(56) References Cited

U.S. PATENT DOCUMENTS

| | | | | |
|---|---|---|---|---|
| 7,246,347 | B1 * | 7/2007 | Shaylor et al. ............... | 717/166 |
| 7,499,950 | B2 * | 3/2009 | Draluk et al. .................. | 1/1 |
| 2004/0098715 | A1 * | 5/2004 | Aghera et al. ................ | 717/173 |
| 2004/0133887 | A1 * | 7/2004 | Herle et al. ................... | 717/171 |
| 2004/0261072 | A1 * | 12/2004 | Herle ............................. | 717/171 |
| 2005/0039178 | A1 * | 2/2005 | Marolia et al. ................ | 717/168 |
| 2005/0055397 | A1 * | 3/2005 | Zhu et al. ...................... | 709/200 |
| 2005/0060361 | A1 * | 3/2005 | Chatrath et al. .............. | 709/200 |
| 2005/0138373 | A1 * | 6/2005 | Clark et al. ................... | 713/166 |
| 2005/0232175 | A1 * | 10/2005 | Draluk et al. ................. | 370/310 |
| 2006/0039564 | A1 * | 2/2006 | Rao ............................... | 380/270 |
| 2006/0059473 | A1 | 3/2006 | Moler | |

FOREIGN PATENT DOCUMENTS

| | | |
|---|---|---|
| EP | 1681832 A1 | 7/2006 |
| WO | 03/073306 | 9/2003 |
| WO | 2005/091108 | 9/2005 |
| WO | 2006/070045 | 7/2006 |

OTHER PUBLICATIONS

OMA: "EFI Manage Application Class," OMA-WAP-EFIMAC-VI_1-20040609-C, Jun. 9, 2004, XP002481319.
UK Intellectual Property Office, Search Report dated Nov. 20, 2007 for GB0620927.4.

* cited by examiner

*Primary Examiner* — Emerson Puente
*Assistant Examiner* — Dong Kim
(74) *Attorney, Agent, or Firm* — Workman Nydegger

(57) ABSTRACT

A framework whereby mobile terminals are configured and managed by a central server. In accordance with one aspect of the present invention, there is provided a mobile telecommunications terminal including a first execution environment and a second execution environment, each execution environment being arranged to execute a respective device management agent and each agent issuing, in accordance with instructions from a device management server, management actions that act upon one or more respective management entities running within one or more of the execution environments; wherein the management entities of the second execution environment are grouped into a management structure, the management structure being one of the management entities within the first execution environment, whereby the he first and second execution environments permit the device management server is permitted to manage applications and/or services running within both.

16 Claims, 1 Drawing Sheet

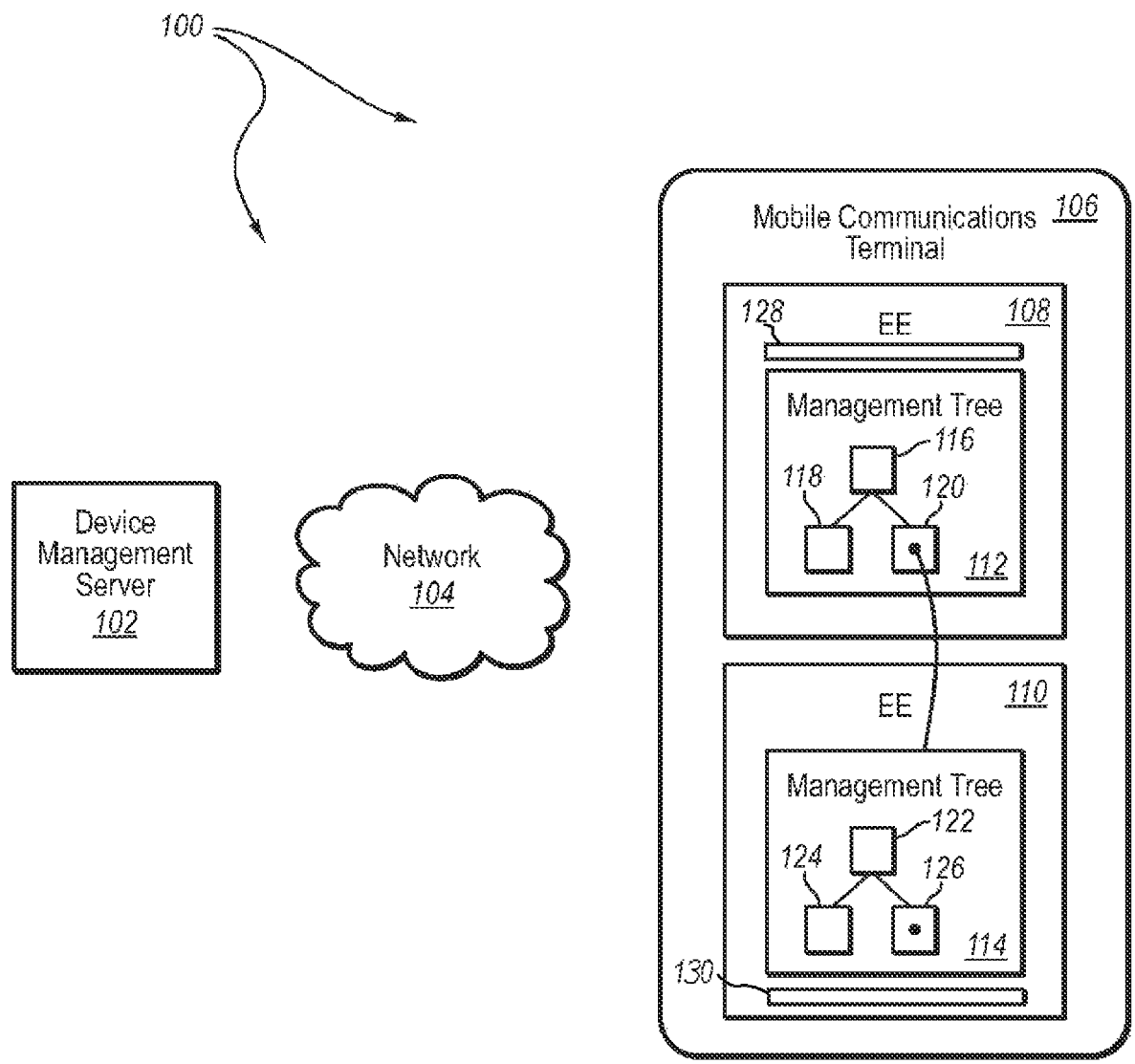

DEVICE MANAGEMENT

CROSS-REFERENCE TO RELATED APPLICATION

This application claims priority to UK Patent Application No. GB0620927.4, filed on Oct. 20, 2006, which is incorporated herein by reference in its entirety.

BACKGROUND

1. Field of the Invention

The invention relates to a system for device management. In particular, the invention relates a framework whereby mobile terminals are configured and managed by a central server.

2. Description of the Related Art

Device management (DM) in mobile telecommunications systems allows the mobile network operator to manage and update various aspects of individual mobile terminals, such as mobile phone handsets. For example, configuration settings can be managed and the software and/or firmware can be updated "over-the-air" (OTA).

DM has been implemented in a number of ways. One example of a DM scheme is the scheme developed by the industry standards body OMA (Open Mobile Alliance). The OMA DM specifications introduce the notion of management objects (MOs). MOs are entities that can be manipulated by, or remotely triggered by, management actions. In this scheme, the MOs are logically grouped in a hierarchical structure referred to as a "management tree".

Each DM-capable mobile terminal is provided with a DM client application: a piece of software that interacts with a management server (located in the mobile telecommunications network) and accepts MOs from the management server. The MOs are used to update the management tree, and in turn the management functions are implemented. The MOs will usually contain configuration settings and/or data for applications and services on the terminal, however the DM specifications do not mandate what data can or cannot be carried in an MO, or what effect that data will have on the terminal. Specifications of permitted data are made as required by any given implementation.

To avoid security issues, a DM client may identify and authenticate a DM server before accepting MOs from the server, and similarly the DM server may identify and authenticate the DM client. The DM client may therefore possess certain credentials and settings to instruct it how to contact the correct DM server and how to correctly handle the mutual authentication required.

Conventionally, a DM agent on a terminal is capable of managing a single main execution environment on a terminal, such as an environment in which applications or other software may be executed, such as the main OS and the applications running above it. In newer terminals, however, it is contemplated that more than one execution environment (EE) may be provided on a terminal. These newer terminals are thereby capable of running applications in a first EE that is effectively separated from a second EE, and also separated from further EEs. This separability is convenient for reasons of security, reliability and possibly efficiency. An example of such a terminal would be a terminal running a rich OS, such as Symbian, (a first EE) and a separate secure EE, where trusted applications or tasks may run in an isolated and trusted environment (a second EE).

Multiple OSs may also coexist on the same platform when the terminal is arranged with a "hypervisor" (or virtualization software) and/or dual processor architecture.

As will readily be appreciated from the foregoing, managing different execution environments on a single device represents a considerable additional burden on the processing capacity of that device. While a DM agent may perform an identical management operation in each EE or OS, the separation of the EEs may necessitate a new hierarchical structure of MOs (management tree) as well as a duplication of DM code, configuration and server authentication data for each EE.

Even where technical restrictions such as isolation do not necessitate the above duplications, there may be circumstances in which the assets in different terminal areas or environments must be managed by different parties, and this may require that two environments need to be managed by different DM servers. Whenever more than one DM server is required to manage different terminal environments and/or assets, multiple management trees and sets of DM configuration and authentication data may be required.

SUMMARY OF EXAMPLE EMBODIMENTS

It is therefore an object of the invention to obviate or at least mitigate the aforementioned problems.

In accordance with one aspect of the present invention, there is provided a mobile telecommunications terminal including a first execution environment and a second execution environment, each execution environment being arranged to execute a respective device management agent and each agent issuing, in accordance with instructions from a device management server, management actions that act upon one or more respective management entities running within one or more of the execution environments; wherein the management entities of the second execution environment are grouped into a management structure, the management structure being one of the management entities within the first execution environment, whereby the first and second execution environments permit the device management server to manage applications and/or services running within both.

In accordance with a further aspect of the present invention, there is provided a method for processing management actions received from a device management server by a terminal, comprising: providing a first execution environment and a second execution environment; in the first execution environment, executing a first device management agent, the first agent issuing, in accordance with instructions from a device management server, management actions that act upon one or more respective management entities running within the first execution environment; in the second execution environment, executing a second device management agent, the second agent issuing, in accordance with instructions from a device management server, management actions that act upon one or more respective management entities running within the second execution environment; wherein the management entities of the second execution environment are grouped into a management structure, the management structure being one of the management entities within the first execution environment.

BRIEF DESCRIPTION OF THE DRAWINGS

Aspects of example embodiments of the invention will become apparent from the following description of example embodiments given in conjunction with the accompanying drawings, in which:

FIG. 1 discloses an example mobile telecommunications system and an example method for processing management actions received from a device management server.

DETAILED DESCRIPTION OF EXAMPLE EMBODIMENTS

Devices can have more than one execution environment (EE). For example, the device may have more than one Operating System running, or it may have a secure environment/area and a non-secure execution environment, where the secure environment could be isolated by software and/or hardware controls or could even be a hardware-based secure element within the terminal. Even a removable smartcard such as the SIM card could be considered an EE of the device.

Conventionally, there is a separate DM agent in each EE and a separate management tree in each EE to manage the two separate operating systems. However, this requires two separate communication channels to the server and two sets of configuration. Each DM agent is required to maintain separate instances of credentials, settings and channels to the DM server(s). This in turn takes up extra bandwidth, processing capacity and cost. In short, such an approach does not scale effectively.

Where a plurality of execution environments are present, it would be desirable to be able to manage these EEs in an analogous manner to the way the main EE is managed.

With reference now to FIG. 1, an example mobile telecommunications system 100 is disclosed, as well as example method for processing management actions received from a device management server. The system 100 includes an example device management server 102, an example mobile telecommunications network 104, and an example mobile communication terminal 106. The example terminal 106 can communicate with the example device management server 102 over the example mobile telecommunication network 104.

The example terminal 106 includes a first execution environment (EE) 108 and a second EE 110. In one example embodiment of the invention, management entities, such as MOs 122, 124, and 126, of the second execution environment 10 are grouped into a management structure of MOs, such as a management tree 114, and this management structure 114 is itself defined as an MO 120 of the first EE 108. A management structure for one EE treated as an MO for another EE is referred to as a "virtual management tree" (VMT) and relies on the fact that DM specifications place no restrictions on what data can be carried in an MO.

The DM server 102 for the first EE 108 can therefore manage both the management tree 112 for the first EE 108 and the management tree 114 for the second EE 110 (using the VMT 120) via the connection with the DM agent 128 in the first EE 108.

The DM server 102 is responsible for delivering the MOs to a DM agent, but is not necessarily the original author of the MOs. For example, the MO author may sign the MO and then deliver it to the DM server 102 who would be responsible for distributing the MO to terminals. In this case, the DM agent 128 would authenticate the DM server 102 delivering the MOs, but would also specifically authenticate the MOs being delivered to ensure that they came from the correct MO author. Similarly, the use of VMTs is also possible even when the author of MOs for the second EE 110 differs from the author of MOs for the first EE 108.

Once the VMT 120 has been delivered to the DM agent 128 of the first EE 108, this DM agent 128 can then pass the contents of the VMT 120 directly to the DM agent 130 of the second EE 110 for processing.

Advantageously, the DM agent 128 of the first EE 108 could even be considered to be a proxy DM server for the DM agent 130 of the second EE 110 if required. In this case, the structure of the DM client 114 of the second EE 110 and communications protocols would be almost standard except that the DM agent 130 of the second EE 110 does not need to establish communications to the remote DM server 102. This could be especially useful if one EE is a smartcard.

By nesting management trees (via the use of VMTs), this example embodiment of the invention provides a more efficient solution than provisioning each EE with a fully independent DM agent since fewer server connections are required.

In one embodiment of the invention, a terminal is provided with a plurality of EEs, and is capable of running a DM agent. There is an MO for each managed object (service or application) in one or more of the EEs. However, since DM protocols are agnostic about the contents or values of MOs, an MO for a second EE (or indeed an entire management tree for this EE) can be handled as a (virtual) MO in the management tree of the first EE. In other words, the second EE is managed via a particular VMT in the management tree of the first EE.

Consider the case where the first EE is a "secure area" and the second EE is a "non-secure area". By arranging that there is a single management tree (in the secure area) and building a Virtual Management Tree into this tree which is linked into the other EE (the non-secure area), one need only set up one communication channel, configuration etc. All MOs for the operating system in the non-secure area would be grouped into a VMT and come into the management tree in the secure area and then get directed into the DM agent of the other operating system in the other EE.

The above embodiment assumes that there is trusted EE (TEE) from which other EEs can be managed. In one instance, a trusted EE may be responsible for managing both itself and a rich OS. In another instance, each OS on the terminal may lie above some virtualization software, which could itself be responsible for the management of all the OSs (or EEs) above it.

Other arrangements are also contemplated, for example an arrangement where the first EE 108 is the main OS of the device, and the second EE 110 is a TEE isolated from the main OS 108, where the management tree 114 for the trusted EE 110 is a VMT 120 within the management tree 112 of the main OS 108. Such an arrangement has the advantage of avoiding the need to implement complex communications protocols within the trusted area, keeping it as simple and secure as possible. Since the levels of trust in the TEE 110 are higher than in the main OS 108, the management tree 114 of the TEE 110 can then be independently protected and authenticated (e.g. by digitally signing the MOs) before being transformed into a VMT 120 and delivered by the DM server 102 of the main OS 108 to the DM agent 128 of the main OS 108.

In the preceding embodiments, each additional EE can be managed as a VMT in the main management tree. In this case the DM client in the main EE would receive VMTs for other EEs. These VMTs could be stored in the main management tree (and the main EE can take the appropriate management actions in the managed EEs), or they could be passed directly to the DM clients in the relevant EEs for processing.

If a DM server wishes to manage a particular EE, the VMT associated with that EE can be updated in the main management tree, and the main DM agent would then pass that VMT to the relevant EE for processing or deal with the management functions itself.

As a result of the above example embodiment, the main management tree 112 is accessible by the DM server 102 and the main DM client 112 communicates directly with the server 102. This addresses the problems of code duplication and configuration identified earlier.

This example embodiment of the invention facilitates efficient management of execution environments through the DM framework. The use of the DM framework also means that the interface is familiar to network operator and device user alike.

What is claimed is:

1. A mobile telecommunications terminal configured to receive instructions from a device management server, the mobile telecommunications terminal comprising:
   a first execution environment that executes a first device management agent which issues management actions that act upon one or more management entities running within the first execution environment in accordance with instructions received from the device management server, the first execution environment being a secure execution environment; and
   a second execution environment that executes a second device management agent which issues management actions that act upon one or more management entities running within the second execution environment in accordance with instructions received from the device management server, the second device management agent executing separately from the first device management agent, the second execution environment being a secure execution environment having a level of trust higher than the first execution environment and having a management tree that can be independently protected and authenticated;
   wherein the management entities of the second execution environment are grouped into a management structure, the management structure being one of the management entities within the first execution environment,
   whereby applications and services running within the first execution environment and applications and services running within the second execution environment are manageable by the device management server.

2. A terminal as claimed in claim 1, wherein the first execution environment is the main operating system of the terminal.

3. A terminal as claimed in claim 1, wherein at least one of the device management agents is configured to deliver management actions to one or more of the management entities in response to instructions received from the device management server.

4. A terminal as claimed in claim 1, further comprising means for receiving management actions that originate with an original management action author, wherein the means for receiving management actions operates to deliver received management actions to the device management server.

5. A terminal as claimed in claim 1, wherein the first execution environment is a proxy device management server for the device management agent of the second execution environment.

6. A terminal as claimed in claim 1, wherein at least one of the execution environments is implemented in a hardware-based secure element.

7. A terminal as claimed in claim 1, wherein at least one of the execution environments is implemented in a removable smartcard.

8. A terminal as claimed in claim 1, wherein the first and second execution environments both comprise operating systems.

9. A terminal as claimed in claim 1, wherein the terminal is configured to allow applications and services running within the second execution environment to be managed by the data management server without the second execution environment establishing communications with the device management server.

10. A terminal as claimed in claim 1, wherein the first execution environment encompasses a secure area and the second execution environment encompasses a non-secure area.

11. A method for processing management actions received from a device management server by a mobile telecommunications terminal having first and second execution environments, the first and second execution environments being secure execution environments, the second execution environment having a level of trust higher than the first execution environment and having a management tree that can be independently protected and authenticated, the method comprising:
   in the first execution environment, executing a first device management agent, the first device management agent issuing, in accordance with instructions from a device management server, management actions that act upon one or more management entities running within the first execution environment;
   in the second execution environment, executing a second device management agent separately from the first device management agent, the second device management agent issuing, in accordance with instructions from a device management server, management actions that act upon one or more management entities running within the second execution environment;
   wherein the management entities of the second execution environment are grouped into a management structure, the management structure being one of the management entities within the first execution environment.

12. A method as claimed in claim 11, wherein the first execution environment is the main operating system of the terminal.

13. A method as claimed in claim 11, further comprising issuing instructions to one of the respective device management agents to deliver management actions to one or more of the management entities, the instructions being received from the device management server.

14. A method as claimed in claim 11, further comprising:
   receiving management actions that originate with an original management action author; and
   delivering the received management actions to the device management server.

15. A method as claimed in claim 11, wherein the first execution environment is a proxy device management server for the device management agent of the second execution environment.

16. A mobile telecommunications terminal configured to receive instructions from a device management server, the mobile telecommunications terminal comprising:
   a first secure execution environment;
   a first device management agent executed by the first secure execution environment;
   one or more first management entities running within the first secure execution environment, the first management entities being acted upon by management actions issued by the first device management agent in accordance with instructions received from the device management server;
   a second secure execution environment having a level of trust higher than the first secure execution environment and having a management tree that can be independently protected and authenticated;

a second device management agent executed by the second secure execution environment, the second device management agent executing separately from the first device management agent; and one or more second management entities running within the second secure execution environment, the second management entities being acted upon by management actions issued by the second device management agent in accordance with instructions received from the device management server, the second management entities of the second secure execution environment being grouped into a management structure, the management structure being one of the first management entities within the first secure execution environment;

wherein applications and services running within the first secure execution environment and applications and services running within the second secure execution environment are manageable by the device management server.

* * * * *